US012078421B2

(12) United States Patent
Cui et al.

(10) Patent No.: US 12,078,421 B2
(45) Date of Patent: Sep. 3, 2024

(54) INSTALLATION METHOD OF REFRACTORY FIBER INTEGRAL MODULE

(71) Applicant: LUYANG ENERGY-SAVING MATERIALS CO., LTD., Shandong (CN)

(72) Inventors: Xicun Cui, Shandong (CN); Yaohui Yue, Shandong (CN); Chenghai Feng, Shandong (CN); Kai Chen, Shandong (CN); Jiankai Wang, Shandong (CN); Zuosheng Chen, Shandong (CN)

(73) Assignee: LUYANG ENERGY-SAVING MATERIALS CO., LTD., Shandong (CN)

( * ) Notice: Subject to any disclaimer, the term of this patent is extended or adjusted under 35 U.S.C. 154(b) by 111 days.

(21) Appl. No.: 17/780,553

(22) PCT Filed: Nov. 9, 2021

(86) PCT No.: PCT/CN2021/129485
§ 371 (c)(1),
(2) Date: May 27, 2022

(87) PCT Pub. No.: WO2022/100564
PCT Pub. Date: May 19, 2022

(65) Prior Publication Data

US 2022/0412655 A1 Dec. 29, 2022

(30) Foreign Application Priority Data

Nov. 10, 2020 (CN) ......................... 202011247286.5

(51) Int. Cl.

| | |
|---|---|
| ***F27D 1/16*** | (2006.01) |
| ***F27D 1/00*** | (2006.01) |
| ***F27D 1/14*** | (2006.01) |

(52) U.S. Cl.
CPC ............. *F27D 1/16* (2013.01); *F27D 1/0009* (2013.01); *F27D 1/0013* (2013.01); *F27D 1/141* (2013.01); *F27D 1/144* (2013.01)

(58) Field of Classification Search
CPC .... F27D 1/0003; F27D 1/0009; F27D 1/0013; F27D 1/002; F27D 1/0026; F27D 1/06–063; F27D 1/144; F27D 1/16
See application file for complete search history.

(56) References Cited

U.S. PATENT DOCUMENTS 4,194,282 A * 3/1980 Byrd, Jr. ............... F27D 1/0013 404/49
4,379,382 A * 4/1983 Sauder ...................... F27D 1/06 110/336

(Continued)

FOREIGN PATENT DOCUMENTS

CN 2685793 Y 3/2005
CN 201206948 Y 3/2009

(Continued)

OTHER PUBLICATIONS

Translation of CN102425949 (Year: 2012).*

(Continued)

*Primary Examiner* — Matthew P Travers
(74) *Attorney, Agent, or Firm* — Yue (Robert) Xu; Apex Attorneys at Law, LLP

(57) ABSTRACT

An installation method of a refractory fiber integral module, includes: carrying out construction pretreatment, then welding an anchoring part to a furnace wall, and then laying a tiled layer along the furnace wall; then fixing the refractory fiber integral module neatly on a hot surface of the tiled layer by the anchoring part to form a refractory fiber prefabricated layer, and filling reserved gaps between the refractory fiber integral modules with compensation strips; finally checking (Continued)

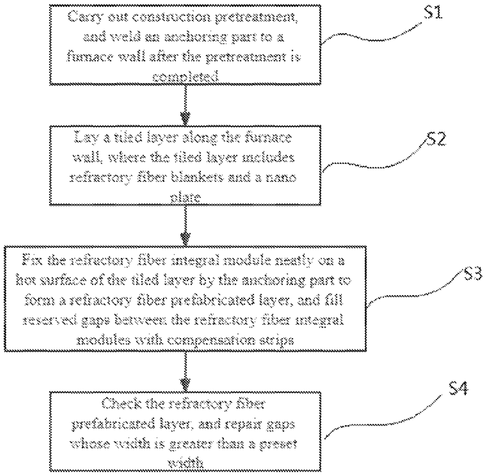

the refractory fiber prefabricated layer, and repairing gaps whose width is greater than a preset width.

7 Claims, 1 Drawing Sheet

(56) References Cited

U.S. PATENT DOCUMENTS

| | | | | | |
|---|---|---|---|---|---|
| 4,481,746 | A | * | 11/1984 | Cimochowski ....... | F27D 1/0013 52/404.1 |
| 4,584,814 | A | * | 4/1986 | Hounsel .................. | F27D 1/141 110/331 |
| 4,848,055 | A | * | 7/1989 | Wade ...................... | F27D 1/144 52/509 |
| 5,316,268 | A | | 5/1994 | Mantey | |

FOREIGN PATENT DOCUMENTS

| | | | | | |
|---|---|---|---|---|---|
| CN | 201443971 | U | * | 4/2010 | |
| CN | 201779988 | U | | 3/2011 | |
| CN | 102425949 | A | | 4/2012 | |
| CN | 103322810 | A | | 9/2013 | |
| CN | 204268892 | U | | 4/2015 | |
| CN | 105276992 | A | | 1/2016 | |
| CN | 106855357 | A | * | 6/2017 | ............. F27D 1/141 |
| CN | 110260659 | A | | 9/2019 | |
| CN | 210921435 | U | * | 7/2020 | |
| CN | 112361821 | A | | 2/2021 | |
| DE | 102013008410 | A1 | | 11/2014 | |
| JP | H04220160 | A | | 8/1992 | |

OTHER PUBLICATIONS

Translation of CN210921435 (Year: 2020).*
Translation of CN105276992 (Year: 2016).*
Translation of CN2685793 (Year: 2005).*
Translation of CN110260659 (Year: 2019).*
International Search Report for PCT/CN2021/129485 mailed Jan. 24, 2022, ISA/CN.

* cited by examiner

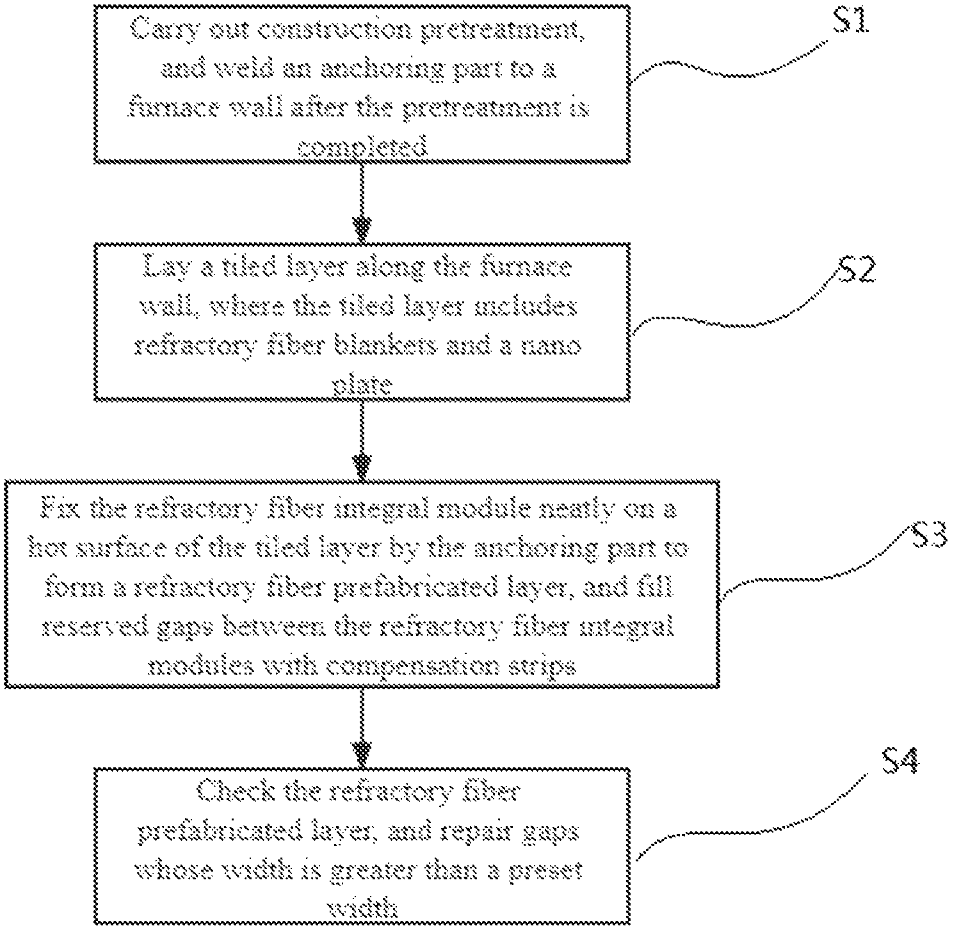
Carry out construction pretreatment, and weld an anchoring part to a furnace wall after the pretreatment is completed
S1
Lay a tiled layer along the furnace wall, where the tiled layer includes refractory fiber blankets and a nano plate
S2
Fix the refractory fiber integral module neatly on a hot surface of the tiled layer by the anchoring part to form a refractory fiber prefabricated layer, and fill reserved gaps between the refractory fiber integral modules with compensation strips
S3
Check the refractory fiber prefabricated layer, and repair gaps whose width is greater than a preset width
S4

INSTALLATION METHOD OF REFRACTORY FIBER INTEGRAL MODULE

This application is the national phase of International Patent Application No. PCT/CN2021/129485, titled “INSTALLATION METHOD OF REFRACTORY FIBER INTEGRAL MODULE”, filed on Nov. 9, 2021, which claims the priority to Chinese Patent Application No. 202011247286.5, titled “INSTALLATION METHOD OF REFRACTORY FIBER INTEGRAL MODULE”, filed with the China National Intellectual Property Administration on Nov. 10, 2020, the entire contents of which are incorporated herein by reference.

FIELD

The present application relates to the technical field of heating furnace construction, and in particular to an installation method of a refractory fiber integral module.

BACKGROUND

An ethylene cracking furnace is a core device of ethylene production devices, its main function is to process various raw materials such as natural gas, refinery gas, crude oil and naphtha into cracked gas, and provide the cracked gas to other ethylene devices. The cracked gas is finally processed into ethylene, propylene and various by-products. The production capacity and technology of the ethylene cracking furnace directly determines the production scale, output and product quality of the entire ethylene device. Reducing energy consumption of the cracking furnace is one of the important ways to reduce the cost of ethylene production.

The energy consumption of ethylene cracking furnace largely depends on the design and the installation method of refractory lining of the cracking furnace system itself. In recent years, cracking furnace technology has developed in the direction of high temperature, short residence time, large-scale and long operation cycle. Therefore, the refractory lining of the cracking furnace is not only required to meet the requirements of high temperature use, but also needs to have the effects of fire resistance and energy saving. The conventional brick wall lining structure has high thermal conductivity and low thermal efficiency. In addition, due to the poor thermal shock resistance of the brick wall structure, the lining cracks due to thermal stress during long-term use at high-temperature. The expansion of the cracks causes the brick wall structure to fall off, thereby reducing the service life of the lining. In order to improve the thermal efficiency of the ethylene cracking furnace, the full-fiber lining has become a research focus because of its low thermal conductivity and good thermal shock resistance.

For the current lining structure that uses ceramic fiber modules and the like, due to the poor wind erosion resistance of the fiber products, fibers become powder after long-term influence of wind speed and furnace atmosphere, reducing the service life of the lining. Therefore, the use of refractory fiber integral modules for the full-fiber furnace lining may improve the life and the thermal efficiency of the fiber furnace lining. Refractory fiber integral modules have high requirements on both construction technology and equipment, but the current construction of refractory fiber integral modules is not standardized and lacks scientific installation methods. Refractory fiber integral modules often crack and fall off during the production process of the ethylene cracking furnace, which seriously affects the normal production of the ethylene cracking furnace.

Therefore, how to prevent the refractory fiber integral module from cracking and falling off due to improper construction is a technical problem to be solved by those skilled in the art.

SUMMARY

An object of the present application is to provide an installation method of a refractory fiber integral module.

In order to achieve the above object, an installation method of a refractory fiber integral module is provided according to the present application, which includes:

carrying out construction pretreatment, and welding an anchoring part to a furnace wall after the pretreatment is completed;

laying a tiled layer along the furnace wall, where the tiled layer includes refractory fiber blankets and a nano plate;

fixing the refractory fiber integral module neatly on a hot surface of the tiled layer by the anchoring part to form a refractory fiber prefabricated layer, and filling reserved gaps between the refractory fiber integral modules with compensation strips; and checking the refractory fiber prefabricated layer, and repairing gaps whose width is greater than a preset width.

Preferably, the step of carrying out construction pretreatment includes:

erecting a scaffold in a furnace chamber, where a distance between the scaffold and the furnace wall is not greater than a first preset value; and derusting, after the scaffold is erected, the furnace wall to remove welding slag, floating dust, rust and oil stains on the furnace wall to weld the anchoring part.

Preferably, the step of welding anchoring part to the furnace wall after the pretreatment is completed further includes:

checking welding quality of the anchoring part.

Preferably, the step of laying a tiled layer along the furnace wall includes:

- performing a water spray test on the furnace wall to determine whether weld seam is leaking, and if it leaks, performing repair welding;
- tensing one refractory fiber blanket from one end to another end, and then passing the tensed refractory fiber blanket through the anchoring part and fixing the refractory fiber blanket with a quick snapping piece; flattening the fixed refractory fiber blanket;
- repeatedly performing the action of tensing the refractory fiber blanket from one end to another end until a first tiled layer covering an inner side wall of the furnace wall is formed;
- tiling the nano plate from one end to another end, then passing the nano plate through the anchoring part and fixing the nano plate with the quick snapping piece, flattening the fixed nano plate;
- repeatedly performing the action of tensing the nano plate from one end to another end until a second tiled layer covering the first tiled layer is formed;
- tensing another refractory fiber blanket from one end to another end, and then passing the tensed refractory fiber blanket through the anchoring part and fixing the refractory fiber blanket with the quick snapping piece; flattening the fixed refractory fiber blanket until a third tiled layer covering the second tiled layer is formed;
- wherein the tiled layer includes at least two layers of the refractory fiber blankets and at least one layer of nano plate, seams of the two layers of refractory fiber blankets are staggered with each other, and a seam spacing is larger than a second preset value.

Preferably, the step of checking the refractory fiber prefabricated layer, and repairing gaps whose width is greater than a preset width includes:

checking the refractory fiber prefabricated layer, and if there is a gap in the refractory fiber prefabricated layer, determining whether the gap is larger than the preset width;

if the gap is larger than the preset width, stuffing the refractory fiber blanket folded in half into the gap.

Preferably, a range of the second preset value is greater than 50 mm.

Preferably, the step of fixing the refractory fiber integral module neatly on a hot surface of the tiled layer by the anchoring part includes:

aligning a guide pipe of the refractory fiber integral module with the anchoring part, and sleeving the guide pipe on the anchoring part, and fixing the refractory fiber integral module by screwing a nut with the anchoring part.

Preferably, the compensation strip is made by folding the refractory fiber blanket in half and compressing the refractory fiber blanket to a preset size.

The installation method of the refractory fiber integral module provided according to the present application includes the following steps: firstly, carrying out construction pretreatment, and welding the anchoring part to the furnace wall after the pretreatment is completed; then laying the tiled layer along the furnace wall, where the tiled layer is the refractory fiber blanket; and then fixing the refractory fiber integral module neatly on the hot surface of the tiled layer by the anchoring part to form the refractory fiber prefabricated layer, and filling reserved gaps between the refractory fiber integral modules with compensation strips; and finally checking the refractory fiber prefabricated layer, and repairing gaps whose width is greater than the preset width.

Laying the tiled layer along the furnace wall during construction makes the inner side of the furnace wall flat and ensures that the refractory fiber integral modules are installed on a smooth plane, thus reducing the risk of the refractory fiber integral module falling off. In addition, there are reserved gaps between the refractory fiber integral modules, and the reserved gaps are filled with compensation strips to avoid gaps in the refractory fiber integral modules due to thermal shrinkage. Finally, the gaps in the refractory fiber prefabricated layer are filled. As the filler is sufficient, the expansion force of the filler prevents the refractory fiber integral modules from cracking.

BRIEF DESCRIPTION OF THE DRAWINGS

For more clearly illustrating embodiments of the present application or the technical solutions in the conventional technology, drawings to be used in the description of the embodiments or the conventional technology will be briefly described hereinafter. Apparently, the drawings in the following description are only some embodiments of the present application. For those skilled in the art, other drawings may be obtained based on the provided drawings without any creative work.

FIG. 1 is a flow chart of an installation method of a refractory fiber integral module provided by the present application.

DETAILED DESCRIPTION OF THE EMBODIMENTS

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments in the present application, all of the other embodiments which are obtained by those skilled in the art without any creative work fall within the protection scope of the present application.

In order to provide the person skilled in the art with a better understanding of the solution of the present application, the present application is described hereinafter in further detail in conjunction with the drawings and embodiments.

Referring to FIG. 1, FIG. 1 is a flow chart of an installation method of a refractory fiber integral module provided by the present application.

The installation method of the refractory fiber integral module provided by the present application includes:

S1, carrying out construction pretreatment, and welding an anchoring part to a furnace wall after the pretreatment is completed;

Optionally, the construction staff first erects a scaffold in a furnace chamber, a distance between layers of the scaffold is generally 1.8 to 2.0 meters, and a distance between the scaffold and the furnace wall is not greater than the first preset value, and the first preset value may specifically be 0.5 meters. The user may also set the first preset value according to needs. A full-space springboard is laid between the scaffolds. The scaffold should be firm, safe and reliable. The scaffold should be dismantled from top to bottom, and it is strictly forbidden to operate up and down at the same time.

After the scaffold is erected, the furnace wall is derusted, construction stuff may manually remove rust with electric brushes and wire brushes to remove welding slag, floating dust, rust and oil stains on the furnace wall. After derusting, welding requirements for the anchoring part need to be met.

After the treatment is completed, the construction stuff marks the welding position of the anchoring part according to the specified distance in the construction drawings, and the deviation of the marking is required no to exceed ±1 mm. When welding, the anchoring part is vertically welded on the furnace wall where a welding spot is located. After welding, the welding quality is checked. Specifically, circumference of the bottom of the anchoring part should be fully welded without undercut. After hammering inspection, the anchoring part should make a clear and sonorous metallic sound.

S2, laying a tiled layer along the furnace wall, where the tiled layer includes refractory fiber blankets and a nano plate;

Optionally, before laying the tiled layer, it is necessary to perform a water spray test on the furnace wall to determine whether weld seam is leaking, and if it leaks, repair welding is carried out until the weld seam no longer leaks.

In the laying process, laying is started from one side of the furnace wall. Firstly, one refractory fiber blanket is tensed from one end to another end, and then the tensed refractory fiber blanket is passed through the anchoring part, the refractory fiber blanket fits with the outer periphery of the anchoring part under its own tension, then the refractory fiber blanket is fixed with a quick snapping piece, and then the fixed refractory fiber blanket is flattened. After laying of this one refractory fiber blanket is completed, the next refractory fiber blanket is then laid, and the seam between the blankets is tight, so as to avoid the formation of straight seam. Until the whole furnace wall is covered, a first tiled layer is formed.

After laying of the first tiled layer is completed, a second tiled layer is then laid. The second tiled layer is the nano plate. The nano plate is tiled from one end to another end, then the nano plate is passed through the anchoring part and is fixed with the quick snapping piece, and then the fixed nano plate is flattened. After laying of this nano plate is completed, the next refractory fiber blanket is then laid, and the seam between the plates is tight, so as to avoid the formation of straight seam. Until the whole furnace wall is covered, the second tiled layer located above the first tiled layer is formed.

Then, the third tiled layer is laid, and the third tiled layer adopts the refractory fiber blanket. For the specific laying steps, reference can be made to the first tiled layer, which will not be repeated here. After the laying is completed, a third tiled layer located above the second tiled layer is formed.

The tiled layer generally needs to lay at least two layers of refractory fiber blankets and one layer of nano plate. The user may also set the tiled layer with no less than four layers. For the specific laying process, reference can be made to the previous three tiled layers, which will not be repeated here. In addition, in order to avoid the formation of seams penetrating the tiled layer in the direction perpendicular to the furnace wall, the seams of the two layers of refractory fiber blankets are staggered with each other, and a seam spacing is greater than a second preset value. The range of the second preset value is greater than 50 mm. In three specific embodiments of this application, the second preset values are respectively selected as 100 mm, 150 mm and 180 mm. The user may also set the second preset value as required, which is not limited here.

S3, fixing the refractory fiber integral module neatly on a hot surface of the tiled layer by the anchoring part to form a refractory fiber prefabricated layer, and filling reserved gaps between the refractory fiber integral modules with compensation strips;

Optionally, when installing the refractory fiber integral modules, the refractory fiber integral modules are arranged in sequence on the hot surface of the tiled layer in a same phase. The hot surface refers to a side surface facing the inner side of the furnace, and the sequential arrangement in a same phase means that high-temperature-resistant side surfaces of all the refractory fiber integral modules are used as the hot surface and are arranged to face the inner side of the furnace. Before installation, installation positions of refractory fiber integral modules of different models and specifications should be clarified, and then construction should be started from one side of the furnace wall. Firstly, a guide pipe of the refractory fiber integral module is aligned with the anchoring part, and the guide pipe is sleeved on the anchoring part, the refractory fiber integral module is pushed along the anchoring part to fit with the tiled layer. Then the refractory fiber integral module is fixed by screwing a nut to the anchoring part with an Allen wrench.

After completing the installation of a row of refractory fiber integral modules, compensation strips need to be installed. The refractory fiber integral modules may shrink when heated, which may cause gaps in the lining. The compensation strip is made by folding the refractory fiber blanket in half and compressing the refractory fiber blanket to a preset size. The compensation strip is expandable to compensate for the size shrinkage of the refractory fiber integral module. After the installation of the compensation strips are completed, another row of refractory fiber integral modules are installed. The installation process is the same as the above steps.

S4, checking the refractory fiber prefabricated layer, and repairing gaps whose width is greater than a preset width.

Optionally, after the installation of the entire surface of the furnace wall is completed, it is necessary to check whether the layout of the refractory fiber integral modules meets the requirements. After the refractory fiber integral module is firmly installed, the guide pipe and other components are drawn out, and the expansion of the refractory fiber integral module itself may compensate for the gap left by the guide pipe. Then, the hot surface of the integral refractory fiber module is lightly pressed by a flat plate to flatten the surface of the refractory fiber prefabricated layer. Finally, the surface of the refractory fiber prefabricated layer is cleaned. After the surface of the refractory fiber prefabricated layer is cleaned, it is checked whether there is a gap in the refractory fiber prefabricated layer. If there is a gap in the refractory fiber prefabricated layer, it is determined whether the gap is larger than a preset width. The preset width may specifically be 5 mm. The user may also set the preset width according to needs, which is not limited here. If the gap is greater than the preset width, the refractory fiber blanket folded in half is stuffed into the gap with a thin steel plate, thereby filling the gap.

According to the installation method of the refractory fiber integral module in this embodiment, firstly, the tiled layer is arranged on the inner side of the furnace wall, so as to ensure that the refractory fiber integral module can be neatly arranged on the inner side of the furnace wall, and to prevent the refractory fiber integral module from falling off. Compensation strips are installed between the refractory fiber integral modules, the refractory fiber blanket is filled in the gap of the refractory fiber prefabricated layer, and the refractory fiber integral module is supported on the compensation strip and the refractory fiber blanket, so as to avoid cracking of the refractory fiber integral module.

It should be noted that, terms such as first and second are merely used to distinguish an entity from other entities and do not require or imply that there are any such actual relationships or sequences between these entities herein.

The installation method of the refractory fiber integral module provided by the present application has been described in detail above. The principle and embodiments of the present application are described through specific examples herein. The description of the above-described embodiments is merely used to facilitate understanding of the method and core idea of the present application. It should be noted that, for those skilled in the art, many improvements and modifications may be further made to the present application without departing from the principle of the present application, and these improvements and modifications also fall within the protection scope of claims of the present application.

The invention claimed is:

1. An installation method of a refractory fiber integral module, comprising:

carrying out construction pretreatment, and welding anchoring parts to a furnace wall after the pretreatment is completed;

laying a tiled layer along the furnace wall, wherein the tiled layer comprises refractory fiber blankets and nano plates;

fixing refractory fiber integral modules on a hot surface of the tiled layer by the anchoring parts to form a refractory fiber prefabricated layer, and filling reserved gaps between the refractory fiber integral modules with compensation strips; and checking the refractory fiber prefabricated layer, and repairing gaps whose width is greater than a preset width, the step of laying the tiled layer along the furnace wall comprises:

performing a water spray test on the furnace wall to determine whether a weld seam is leaking, and if the weld seam leaks, performing repair welding;

laying a plurality of refractory fiber blankets along the furnace wall to form a first tiled layer covering an inner side wall of the furnace wall, wherein each of the plurality of refractory fiber blankets within the first tiled layer is first tensed from one end to another end, then passed through a corresponding anchoring part, then fixed with a snapping piece, and then flattened;

laying a plurality of nano plates along the first tiled layer to form a second tiled layer covering the first tiled layer, wherein each of the plurality of nano plates within the second tiled layer is first tiled from one end to another end, then passed through a corresponding anchoring part, then fixed with a snapping piece, and then flattened; and laying a plurality of refractory fiber blankets along the second tiled layer to form a third tiled layer covering the second tiled layer, wherein each of the plurality of refractory fiber blankets within the third tiled layer is first tensed from one end to another end, then passed through a corresponding anchoring part, then fixed with a snapping piece, and then flattened;

wherein the tiled layer comprises at least two layers of the refractory fiber blankets and at least one layer of nano plates, seams of the two layers of refractory fiber blankets are staggered with each other, and a seam spacing is larger than a second preset value.

2. The installation method according to claim 1, wherein the step of carrying out construction pretreatment comprises:

erecting a scaffold in a furnace chamber, wherein a distance between the scaffold and the furnace wall is not greater than a first preset value; and derusting, after the scaffold is erected, the furnace wall to remove welding slag, floating dust, rust and oil stains on the furnace wall to weld the anchoring parts.

3. The installation method according to claim 1, wherein the step of welding the anchoring parts to the furnace wall after the pretreatment is completed further comprises:

checking a welding quality of the anchoring parts.

4. The installation method according to claim 1, wherein the step of checking the refractory fiber prefabricated layer, and repairing gaps whose width is greater than a preset width comprises:

checking the refractory fiber prefabricated layer, and if there is a gap in the refractory fiber prefabricated layer, determining whether the gap is larger than the preset width; and if the gap is larger than the preset width, stuffing a refractory fiber blanket folded in half into the gap.

5. The installation method according to claim 1, wherein a range of the second preset value is greater than 50 mm.

6. The installation method according to claim 1, wherein the step of fixing the refractory fiber integral modules on a hot surface of the tiled layer by the anchoring parts comprises:

aligning a guide pipe of each of the refractory fiber integral modules with a corresponding anchoring part, and sleeving the guide pipe on the corresponding anchoring part, and fixing the respective refractory fiber integral module by screwing a nut with the corresponding anchoring part.

7. The installation method according to claim 6, wherein each of the compensation strips is made by folding a refractory fiber blanket in half and compressing the refractory fiber blanket to a preset size.

* * * * *